(12) United States Patent
Powell

(10) Patent No.: US 10,015,378 B2
(45) Date of Patent: Jul. 3, 2018

(54) KINEMATIC MOUNT FOR SPLIT CAMERA

(71) Applicant: Microsoft Technology Licensing, LLC, Redmond, WA (US)

(72) Inventor: Karlton David Powell, Lake Stevens, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/266,884

(22) Filed: Sep. 15, 2016

(65) Prior Publication Data
US 2018/0077326 A1    Mar. 15, 2018

(51) Int. Cl.
H04N 5/225    (2006.01)
G02B 7/00    (2006.01)
G03B 17/04    (2006.01)

(52) U.S. Cl.
CPC ........... H04N 5/2254 (2013.01); G02B 7/003 (2013.01); G03B 17/04 (2013.01); H04N 5/2257 (2013.01)

(58) Field of Classification Search
CPC .... H04N 5/2254; H04N 5/2257; G02B 7/003; G03B 17/04
See application file for complete search history.

(56) References Cited

U.S. PATENT DOCUMENTS

| 4,733,945 A | 3/1988 | Bacich |
| 5,748,827 A | 5/1998 | Holl et al. |
| 6,239,924 B1 | 5/2001 | Watson et al. |
| 6,639,740 B1 | 10/2003 | Spinali |
| 6,873,478 B2 | 3/2005 | Watson |
| 6,922,293 B2 | 7/2005 | Watson et al. |

(Continued)

FOREIGN PATENT DOCUMENTS

| CN | 204028444 U | 12/2014 |
| EP | 2500758 A1 | 9/2012 |
| WO | 2010108041 A1 | 9/2010 |

OTHER PUBLICATIONS

"Quick-Release Cage Plates for 60 mm Cage System", Retrieved on: Jun. 22, 2016 Available at: https://www.thorlabs.com/newgrouppage9.cfm?objectgroup_ID=3774.

(Continued)

*Primary Examiner* — Padma Haliyur
(74) *Attorney, Agent, or Firm* — Alleman Hall Creasman & Tuttle LLP (57) ABSTRACT

An electronic device comprising a split camera in front and back portions, and a retaining member. The front portion of the camera includes a set of front mounting features and a light-collecting unit configured to collect light from a subject. The back portion of the camera is reversibly separable from the front portion; it includes a set of back mounting features and an imaging unit configured to image the light. The set of back mounting features is configured to contact the set of front mounting features as the front and back portions are drawn together, forming, cooperatively, a kinematic mount to hold the light-collecting and imaging units in a state of alignment. The retaining member is configured to couple the front portion to the back portion when the front and back portions are drawn together and also when the front and back portions are separated.

19 Claims, 10 Drawing Sheets

(56) References Cited

U.S. PATENT DOCUMENTS

| | | | |
|---|---|---|---|
| 7,311,526 B2 * | 12/2007 | Rohrbach | H01R 13/6205 439/218 |
| 8,520,327 B2 | 8/2013 | Thomas et al. | |
| 8,792,938 B2 | 7/2014 | Kim | |
| 2009/0059043 A1 | 3/2009 | Demuynck | |
| 2012/0093494 A1 | 4/2012 | Wang et al. | |
| 2013/0315577 A1 | 11/2013 | Clark et al. | |
| 2014/0098188 A1 * | 4/2014 | Kwak | G06T 3/40 348/38 |
| 2014/0133897 A1 | 5/2014 | Ceallaigh | |
| 2015/0049244 A1 * | 2/2015 | Tokunaga | G03B 17/14 348/375 |
| 2015/0195439 A1 | 7/2015 | Miller et al. | |
| 2016/0041453 A1 | 2/2016 | Pizzo et al. | |

OTHER PUBLICATIONS

"SPLM-1 high repeatability Polarizer Rotary Mounts/adjustable lens holder", Retrieved on: Jun. 22, 2016 Available at: https://wholesaler.alibaba.com/product-detail/PROMOTION-SPLM-1-high-repeatability-Polarizer_60484816351.html?spm=a2700.7782932.1998701000.2.Up06KW.

Ison, et al., "Optomechanical design for cost-effective DEMVAL systems", In Proceedings of SPIE, Optomechanics: Innovations and Solutions, vol. 8125, Sep. 23, 2011, 3 pages.

"Digital King Magnet Mount Conversion Fisheye Lens for iPhone 4/4s/5/5c/5s/SE", Retrieved on: Jun. 22, 2016 Available at: http://www.bhphotovideo.com/c/product/827960-REG/Digital_King_000DK180_Magnet_Mount_Conversion_Fisheye.html.

"MemsDrive", Retrieved on: Jun. 30, 2016 Available at: http://memsdrive.com/ourproducts/.

"Putting motion in your system has never been so easy", Retrieved on: Jun. 30, 2016 Available at: http://newscaletech.com/.

"Optical Image Stabilization (OIS)", In White Paper of ROHM Semiconductor, Retrieved on: Jun. 30, 2016, pp. 1-13.

Rosa, et al., "Optical Image Stabilization (OIS)", In White Paper of STMicroelectronics, Retrieved on: Jun. 30, 2016, pp. 1-26.

"Micro Inch Positioning with Kinematic Components", Retrieved on: Jun. 30, 2016 Available at: http://www.precisionballs.com/Micro_Inch_Positioning_with_Kinematic_Components.php.

"International Search Report and Written Opinion Issued in PCT Application No. PCT/US2017/051035", dated Nov. 7, 2017, 12 Pages.

* cited by examiner

KINEMATIC MOUNT FOR SPLIT CAMERA

BACKGROUND

Handheld electronic devices with integrated cameras are ubiquitous in the consumer market. Driven by user-comfort and aesthetic considerations, very thin handheld devices are increasingly desirable. Engineering extreme thinness in a camera may be challenging, however, as the focal length of the objective lens system of the camera imposes a lower limit on the thickness. Moreover, the overall rigidity of a handheld device is apt to decrease as the device is made thinner. Loss of rigidity is problematic for optical systems such as cameras, which require precise alignment of internal componentry.

SUMMARY

One embodiment is directed to an electronic device comprising a split camera in front and back portions, and a retaining member. The front portion of the camera includes a set of front mounting features and a light-collecting unit configured to collect light from a subject. The back portion of the camera is reversibly separable from the front portion; it includes a set of back mounting features and an imaging unit configured to image the light. The set of back mounting features is configured to contact the set of front mounting features as the front and back portions are drawn together, forming, cooperatively, a kinematic mount to hold the light-collecting and imaging units in a state of alignment. The retaining member is configured to couple the front portion to the back portion when the front and back portions are drawn together and also when the front and back portions are drawn apart.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Unless otherwise noted, the various drawing scales, aspect ratios, and numbers of components shown in the figures may be purposely distorted to make certain features or relationships easier to see.

Figure 1A:
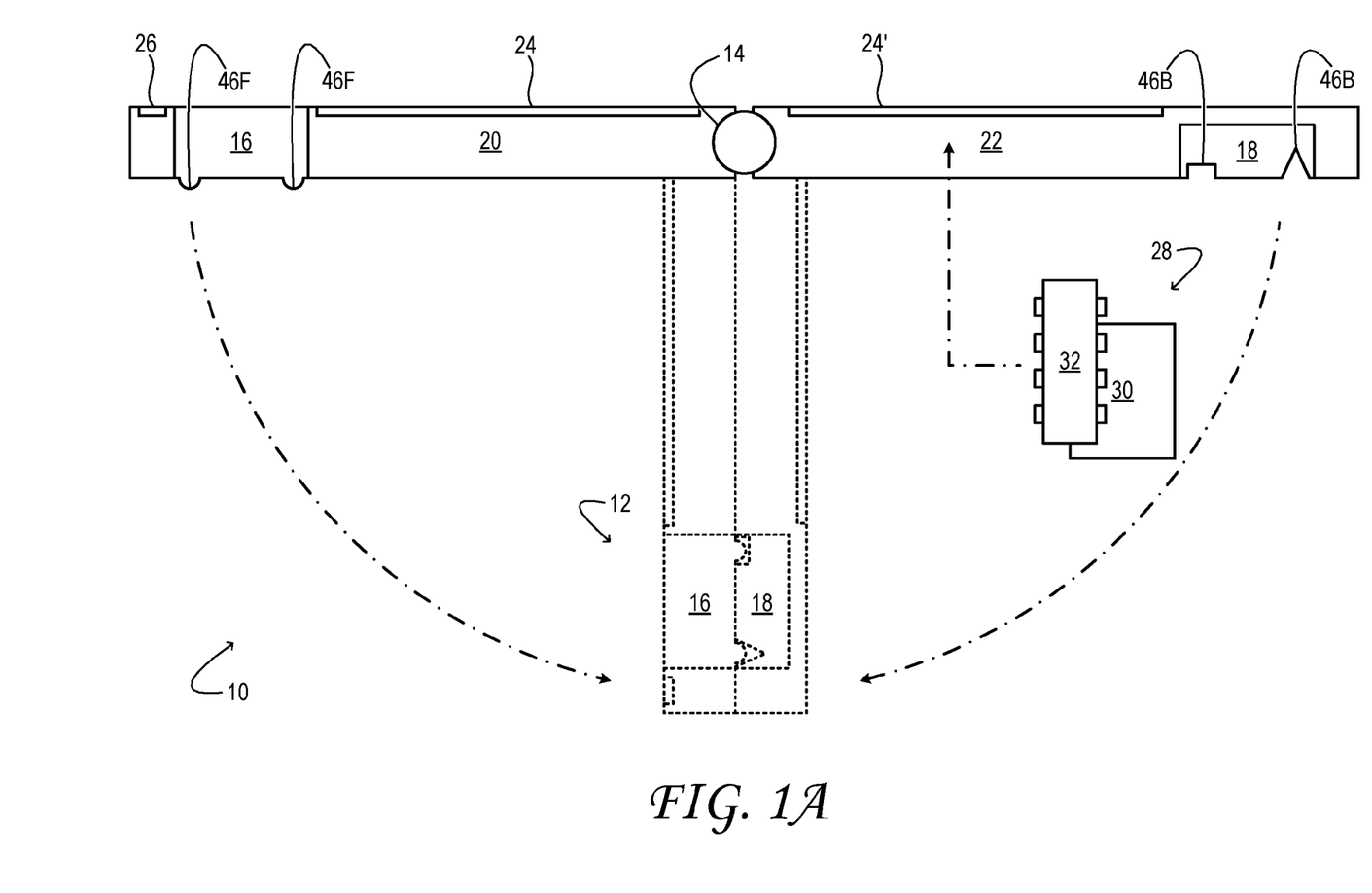
FIGS. 1A, 1B, 1C, and 1D show aspects of an example handheld electronic device.

FIG. 1A shows aspects of an example handheld electronic device 10. The handheld device of FIG. 1 includes a camera component 12 in two portions detachable from each other, and a retaining member 14 that connects the two portions. The handheld device may be embodied as a smartphone, tablet, or laptop computer system, for example. Handheld device 10 is configured to be transitionable, manually, between an unfolded state (drawn in solid lines) and a folded state (drawn in broken lines). The handheld device may be usable in both states, while some features of the device may be available only in one state or in the other.

Camera component 12 of handheld device 10 is not particularly limited with respect to function; it may be a digital color camera, a night-vision camera, a video camera, a depth-imaging camera, etc. As shown in FIG. 1A, the camera component includes a light-collecting unit 16 and an imaging unit 18. The light-collecting unit is configured to collect light from a photographic subject. The imaging unit is configured to capture an image of the subject using light collected by the light-collecting unit.

In the embodiment of FIG. 1A, handheld device 10 is usable as a camera only in the folded state, when light-collecting unit 16 and imaging unit 18 are adjacent to, and aligned with each other. To acquire a photographic image, the user orients the handheld device such that the light-collecting unit faces the photographic subject. Accordingly, portion 20 of the handheld device, which houses the light-collecting unit, is called the 'front portion'; portion 22, which houses the imaging unit, is called the 'back portion'. Because the handheld device can be unfolded and refolded, the front and back portions are reversibly separable from each other, the imaging unit also being reversibly separable from the light-collecting unit.

By dividing camera component 12 into front portion 20 and back portion 22, the configuration of FIG. 1A partitions the focal length of camera component between the two portions. This configuration allows each portion, if engineered with equal or comparable thickness, to be relatively thin. In some embodiments, front portion 20 and back portion 22 are each 3 to 5 millimeters in thickness. Each portion having equal or comparable thickness is desirable if handheld device 10 is engineered to lie flat in the unfolded state. Despite this advantage, other embodiments are envisaged in which the front and back portions have different thicknesses.

In the embodiment of FIG. 1A, at least one display panel (display panel 24, 24', for example) is coupled to each of front portion 20 and back portion 22. Each display panel may be an organic light-emitting diode (OLED) or liquid-crystal display (LCD) panel, for example. In some embodiments, one or more of the display panels may support a resistive or capacitive touch screen.

Handheld device 10 also includes a flash 26 and may include other hardware components not shown in FIG. 1A—cellular, WiFi, and Bluetooth radios, a global-positioning system (GPS) receiver, and an inertial-measurement unit, for example. The various hardware components of the handheld device are operatively coupled to computer 28, which includes a logic machine 30 and an associated electronic memory machine 32. The electronic memory machine may hold instructions that cause the logic machine to execute any automated action or process.

Figures 1B, 1C:
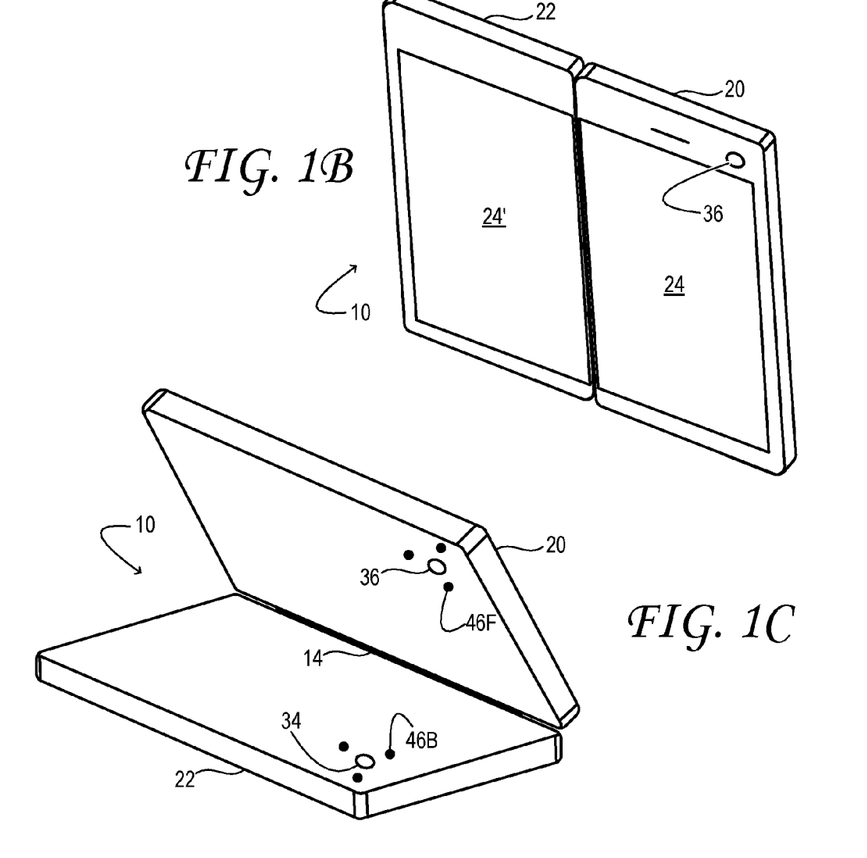
Figure 1D:
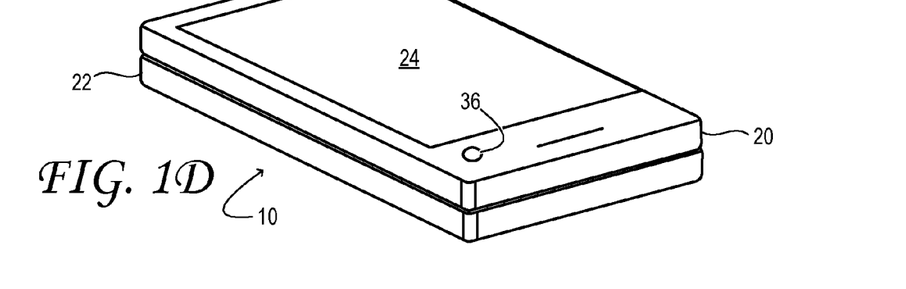

Continuing in FIG. 1A, retaining member 14 of handheld device 10 ensures that front portion 20 stays connected to back portion 22 when the front and back portions are drawn together (roughly aligning the collecting and imaging units) and also when the front and back portions are separated (i.e., drawn apart). In the embodiment of FIG. 1A, the retaining member takes the form of a hinge. Hinged transitioning between folded and unfolded states of the handheld device is further illustrated in the perspective drawings of FIGS. 1B, 1C, and 1D. FIG. 1B shows the handheld device in the unfolded state. FIG. 1D shows the handheld device in the folded state, with iris 34 of the imaging unit aligning with aperture 36 of the light-collecting unit. FIG. 1C shows the handheld device in a partially folded state.

Figure 2:
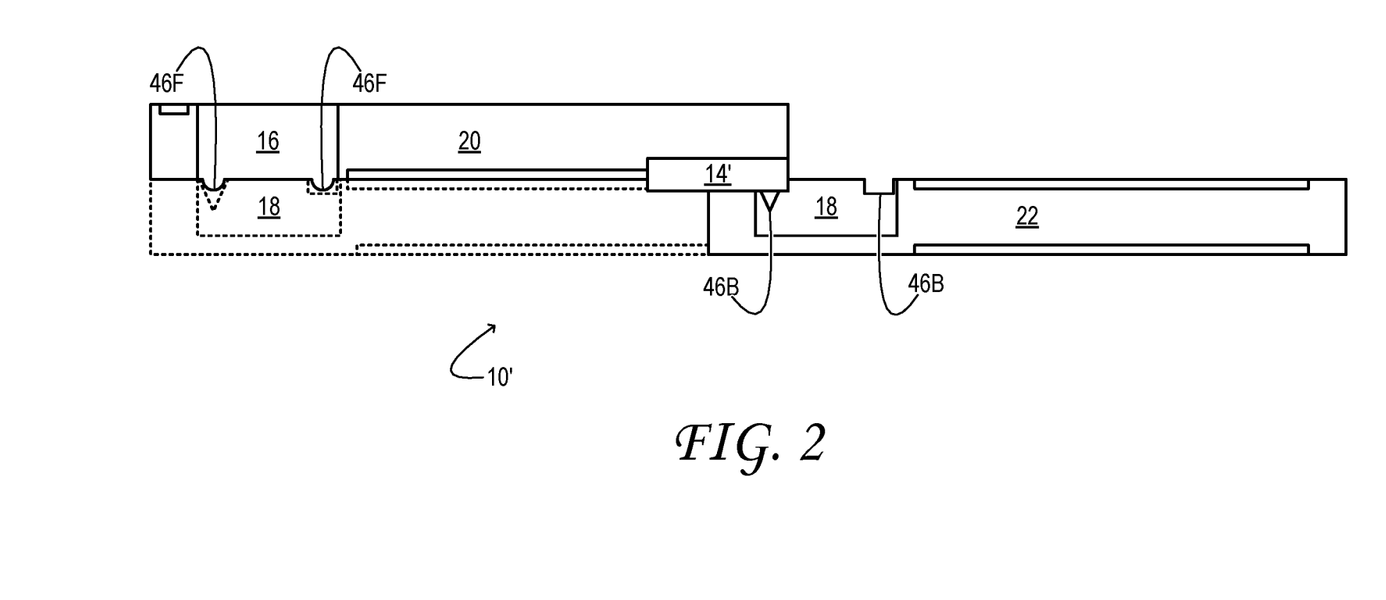
FIG. 2 shows aspects of another handheld electronic device.

Despite the benefits that a folding handheld device offers, other reversibly separable camera geometries are also envisaged. In the embodiment of FIG. 2, retaining member 14' of handheld device 10' takes the form of a slide that glides along opposite edges of front portion 20 and/or back portion 22. In these and other embodiments, the handheld device may include a mechanical or magnetic latch (omitted for clarity in the foregoing drawings) to discourage separation of the front and back portions when camera component 12 is in use.

Figure 3:
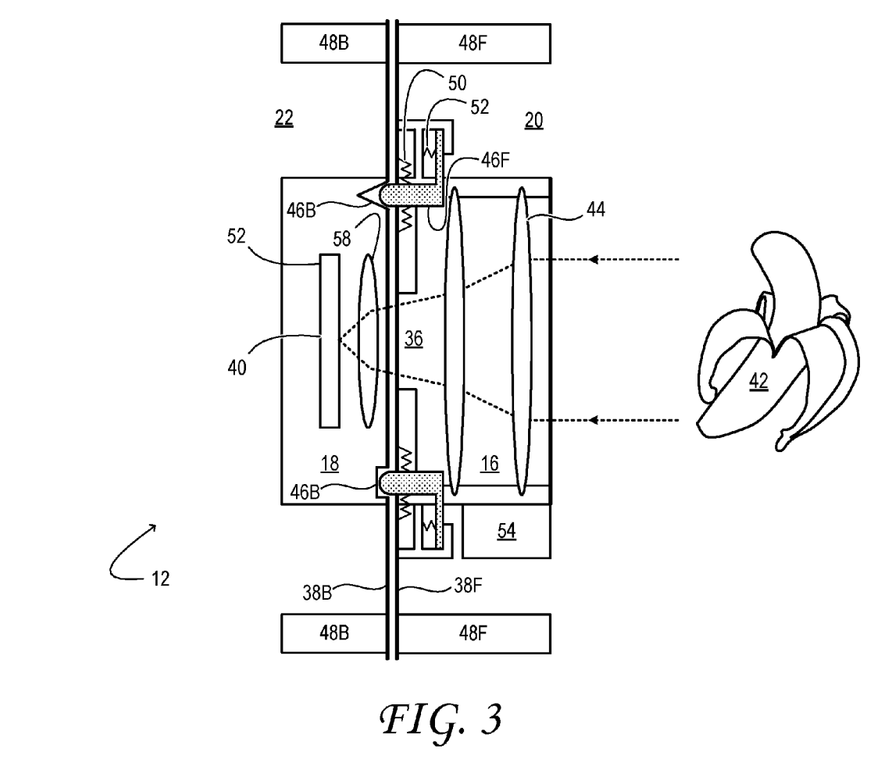
FIGS. 3, 4, 5, and 6 show aspects of example camera components of a handheld electronic device.

FIG. 3 shows aspects of an example camera component 12 of handheld device 10. The drawing schematically shows light-collecting unit 16 and imaging unit 18. A front optical flat 38F is arranged over the light-collecting unit, and back optical flat 38B is arranged over the imaging unit. The optical flats protect the underlying componentry of the light-collecting and imaging units from contamination and damage. Imaging unit 18 includes an optical sensor array 40—a rectangular array of optical sensor elements configured to digitally record an image of photographic subject 42. The light-collecting unit includes a barrel lens system 44 that collects light from the subject and directs the light through aperture 36, forming an image of the subject on the optical sensor array.

No aspect of the drawings should be construed in a limiting sense, for numerous alternative configurations are equally envisaged. Although barrel lens system 44 is shown, for instance, as a single unit contained within light-collecting unit 16, some objective lens systems may include one or more lenses arranged in light-collecting unit 16, and one or more lenses arranged in imaging unit 18. The one or more lenses of the light-collecting unit may be configured to collect the light from the subject, and the one or more lenses of the imaging unit may be configured to receive and convey the light to the optical sensor array of the imaging unit. This variant retains the advantage of dividing the focal length of the objective lens system between the front and back portions. Still other examples may employ a folded optical path (e.g., the subject image received from the light-collecting unit may be conveyed to optical sensor array 40 via a waveguide arranged in the imaging unit).

Secure coupling between light collecting unit 16 and imaging unit 18 may adequately protect camera component 12 from ambient light. In some embodiments, however, an absorptive or black opaque masking, such as screened ink, may be applied to the undersides of front optical flat 38F and back optical flat 38B, within proximity of the camera component. The masking may further prevent contrast loss due to ambient light being optically coupled into optical flats 38F and 38B, light guided within the optical flats, and scattered into the camera component from within—viz., by extraction from the optical flats near aperture 36, via optically wetted scattering media, particulates or smudges on those layers. The masking may reduce or prevent this effect.

FIG. 3 shows light-collecting unit 16 and imaging unit 18 in proper alignment. Image quality improves, naturally, with precision of alignment between the light-collecting and imaging units. To that end, handheld device 10 includes a plurality of mounting features that form, cooperatively, a kinematic mount. The kinematic mount holds the light-collecting and imaging units in a reproducible state of alignment.

A kinematic mount provides the exact number of contact points needed to stably couple one body to another—i.e., to restrict each of three degrees of translational freedom and three degrees of rotational freedom by which the one body can move relative to the other. Typically, one contact point is needed for each degree of freedom, for a total of six. Any coupling arrangement that provides an excess of the required number of contact points will offer the two-body system a plurality of metastable configurations, rather than one equilibrium configuration. When the two bodies approach each other, they may relax into any one of the metastable configurations, leading to irreproducibility of alignment. Furthermore, minute adjustment forces around the equilibrium state may cause the system to 'rock' from one metastable configuration to another, causing instability. Such a system is said to be 'overconstrained'.

To provide an appropriate kinematic mount, front portion 20 of camera component 12 includes a set of front mounting features 46F, and back portion 22 includes a set of back mounting features 46B. The sets of front and back mounting features are cooperatively configured to avoid overconstraint. In particular, the set of back mounting features is configured to contact the set of front mounting features at six contact points as the front and back portions are drawn together. This arrangement of front and back mounting features is also illustrated in FIGS. 1A, 1C, and 2.

The skilled reader will understand that any description of mechanical equilibrium applied to real-world objects must assume an appropriate length scale. Thus, the difference between equilibrium and nearby metastable states is only significant if the metastable states are displaced from equilibrium by a distance that would adversely affect camera alignment in a practical sense. This distance may depend on whether the camera system is equipped with an autofocus (AF) or optical image stabilization (OIS) actuator. For instance, if no actuators are included, the positioning should be repeatable within the depth of focus (DOF) of the focus numerical aperture (NA), which is typically on order of two to ten microns. However, if the camera is equipped with AF, Z may be adjusted so the constraints become more of a concern for lateral alignment, perhaps allowing on order of ten to fifty microns, as long as the additional tolerance range is a fraction of the range required for the actuator to perform the task of achieving focus. OIS actuators may have limited stroke length, on order of a few hundred microns, thus the constraint in this case should be on the order of fifty to one hundred microns, a fraction of the range required to perform suitable OIS. In such a case, any alignment repeatability error detracts from the overall effective stroke length, typically on order of 150 to 400 microns, which may be used for the purposes of optical image stabilization. Configurations that differ from equilibrium by less than this amount do not affect image quality, and exist inevitably due to realistic manufacturing tolerances. Likewise, the term 'six contact points' must also be interpreted with reference to the appropriate length scale. Additional contact points beyond six are problematic only if they offer the system an excursion from equilibrium large enough to adversely affect camera alignment. Additional contact points that manifest themselves only at smaller length scales (e.g., the atomic length scale) are not to be counted.

Continuing in FIG. 3, at least one front magnet 48F is arranged in front portion 20, and at least one back magnet 48B is arranged in back portion 22. The magnets are oriented with opposite poles opposing in the closed state of handheld device 10, in order to draw the front and back portions together and urge front mounting features 46F into back mounting features 46B. In other embodiments, magnets on one side may be replaced by a soft ferromagnetic material. In other embodiments, magnets may be included within the media behind each contact feature, such that each contact pair may include an attractive force to maintain contact of each feature, thus stabilizing the six degrees of freedom. In still other embodiments, magnets on both sides may be omitted, and retaining member 14 may be spring-loaded in order to bias the front and back portions into the closed state. In other words, the retaining member may include a resilient member (e.g., a spring) configured to draw the front and back portions together and urge the set of front mounting features into the set of back mounting features.

In the embodiment of FIG. 3, the set of front mounting features 46F includes one or more protruding features, which extend from light collecting unit 16. In some embodiments, each of the one or more of the protruding features may take the form of a ball or hemisphere. In other embodiments, each of the one or more of the protruding features may take the form of a pin. The set of back mounting features 46B includes one or more receiving features set in the back portion, and configured to receive the one or more protruding features as the front and back portions are drawn together. In some embodiments, each of the one or more receiving features may take the form of a conic depression, a groove, or a flat stop, for example. On receiving a protruding ball, hemisphere, or pin, a conic depression provides three points of contact, a groove provides two, and a flat stop provides one. This analysis relies on a generalized description of the contacting surfaces of the protruding and receiving features, which account for manufacturing tolerances. In particular, each protruding 'ball' or 'hemisphere' is assumed to be a section of an ellipsoid, rather than a perfect sphere. Each conic depression may be elliptical in cross section, and every groove and flat may exhibit a parabolic curvature. This context further informs the term 'six contact points,' as used herein. Specifically, the set of front mounting features 46F meets the set of back mounting features 46B at exactly 'six contact points' assuming the generalized geometry of the mounting features, but neglecting any roughness of the contacting surfaces of the mounting features. As noted above, each point of contact restricts one translational or rotational degree of freedom of relative movement of the light-collecting and imaging units. Accordingly, receipt of each front mounting feature against (e.g., into) an associated back mounting feature restricts one, two, or three degree of freedom of relative movement of the light-collecting and imaging units. The skilled reader will appreciate that front and back mounting features of various other geometries may be paired to yield a desired number of contact points, placed and oriented appropriately so as to null the six degrees of relative movement.

In the embodiment of FIG. 3, the front mounting features 46F are all protruding, and the back mounting features 46B are all receiving. This arrangement is not necessary, however. In other embodiments, the back mounting features may protrude, and the front mounting features may receive. In still other embodiments, some of the front mounting features may protrude, and others may receive. In general, back portion 22 presents a complementary mounting feature co-registered to each mounting feature of front portion 20. The co-registered front and back mounting features may be positioned anywhere with respect to the optical axis of camera portion 12. However, a more stable configuration may result from distributing the mounting features symmetrically around, and as close as possible to the optical axis, limited by physical extent of the camera components, since the two camera portions may have width greater than thickness. Larger radial distances from the optical axis may also be used, as long as consideration is given to accounting for positional shifting caused by the material coefficient of thermal expansion as well as the mechanical stability of the sub-assembly mounts holding each camera portion to its respective set of contact features. Moreover, the number of co-registered front and back mounting feature pairs is not particularly limited. Typical configurations may include three or five feature pairs, but camera components with more or fewer are also envisaged.

In the embodiment of FIG. 3, a floating coupling 50 connects light-collecting unit 16 to front portion 20. Imaging unit 18 is connected to back portion 22 via a fixed coupling. The relaxed rigidity of the floating coupling enables the light-collecting unit to fluidly move into alignment with the imaging unit as the front and back portions approach each other upon closure of handheld device 10. Use of the floating coupling ensures that the manufacturing tolerance of retaining member 14 does not adversely affect the alignment, or provide additional points of rigid contact that may overconstrain the engaged camera component (vide supra). The floating coupling may include a diaphragm or gasket in some examples. Equally envisaged is an alternative arrangement in which a fixed coupling connects the light-collecting unit to the front portion, and a floating coupling connects the imaging unit to the back portion. In still other embodiments, a floating coupling may be used in both the front and back portions.

In some embodiments, floating coupling 50 is a resilient member that serves the additional purpose of retracting one or more of the protruding features (e.g., front mounting features 46F) when the front and back portions are separated. The protruding features may retract into the body of the light-collection unit, for example. Alternatively, or in addition, each protruding feature may be associated with a dedicated resilient member 52 configured to retract that feature when the front and back portions are separated. The restoring force of the resilient member is chosen so as to be overcome by the magnetic force that draws the light-collecting and imaging units together as handheld device 10 is closed. The resilient member may take the form of a spring-plus-retainer combination, or radial bellows spring, or a planar serpentine foil, which may be a substantially flat spring. In embodiments that include a front optical flat 38F and a back optical flat 38B, the front optical flat may be arranged substantially flush (e.g., ±50 microns, 100 microns, 500 microns) with the receiving features of the set of back mounting features 46B; the back optical flat may be arranged substantially flush with the protruding features of the set of front mounting features 46F, when the protruding features are retracted.

In some embodiments, interaction of the sets of front and back mounting features may provide each of the six contact points required to restrict the six degrees of translational and rotational freedom of light-collecting unit 16 relative to imaging unit 18. In other embodiments, contact between front optical flat 38F and back optical flat 38B may provide three of the required six points of contact, such that interaction of the mounting features need only provide the remaining three. In other words, the set of back mounting features may be configured to contact the set of front mounting features at exactly three contact points. This configuration restricts exactly three degrees of freedom of relative movement of the light-collection and imaging units, contact between the front and back optical flats restricting an additional three.

This variant is described with reference to FIGS. 4, 5 and 6, where a set of front mounting features (46F', 46F") is arranged at a corner of front optical flat 38F, and a set of back mounting features (46B', 46B") is arranged at the corresponding (i.e., co-registered) corner of back optical flat 38B. In some examples, the front mounting features may be arranged or embodied as adjacent edge faces of the front optical flat, and the back mounting features may be arranged or embodied as adjacent edge faces of the back optical flat. The set of back mounting features is configured to contact the set of front mounting features as the front and back portions are drawn together with the front and back optical flats in contact, the sets of front and back mounting features and optical flats forming, cooperatively, a kinematic mount to hold the front and back portions in a state of alignment.

Figure 4:
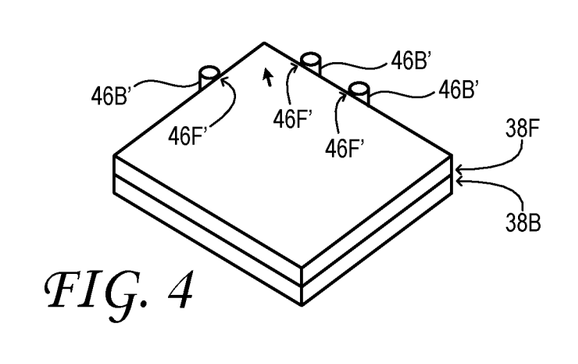
Figure 5:
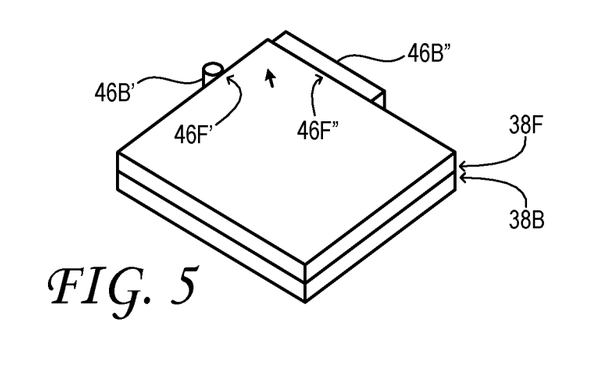

In the embodiments of FIGS. 4 and 5, a set of back mounting features 46B' forms, on receiving the set of front mounting features 46F', a two-point contact and a one-point contact. In FIG. 4, three cylinder-shaped back mounting features 46B' provide the three one-point contacts. Accordingly, the front optical flat may lie flat against one cylinder-shaped back mounting feature to the left of the upper corner (as illustrated); the two other cylinder-shaped back mounting features define two contact points for the orthogonal edge of the front optical flat. In the embodiment of FIG. 5, the two cylinder-shaped back mounting features of the orthogonal edge are replaced by an edge-shaped back mounting feature 46B". In the embodiment of FIG. 6, two edge-shaped back mounting features 46B" are used, the set of front mounting features 46F" forming two two-point contacts on receiving the set of back mounting features 46F". It will be noted that the arrangement of FIG. 6 results in a mount having seven contact points (overconstrained by one degree of freedom). Accordingly, to avoid an overconstrained condition, one of the 46F" edge-shaped back mounting features may be slightly curved, or alternatively may be kept shorter and farther from corner than the other longer edge, such that the longer edge provides two contact points and the shorter edge serves as one contact point, or stop. Thus, the short or rounded edge may serve as a one-point contact within some tolerance. Overconstraint in the embodiment of FIG. 6 may also be masked if at least one of the optical flats is made suitably flexible.

Figure 6:
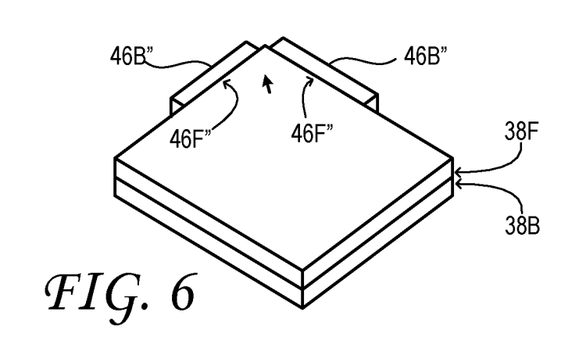
Figure 7A:
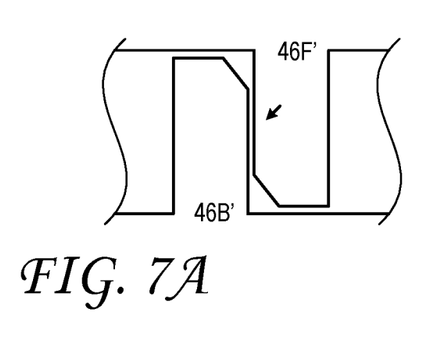
FIGS. 7A-7E illustrate the manner of contact between front and back mounting features of example camera components.
Figure 7B:
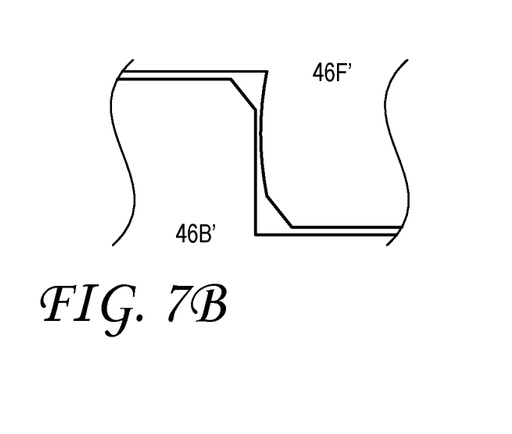
Figure 7C:
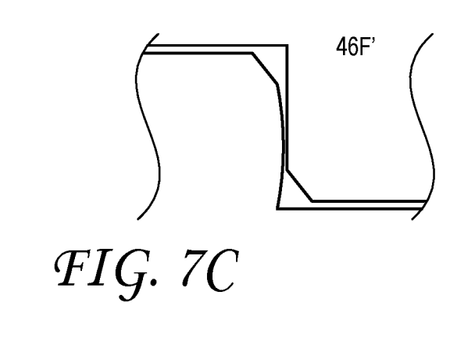
Figure 7D:
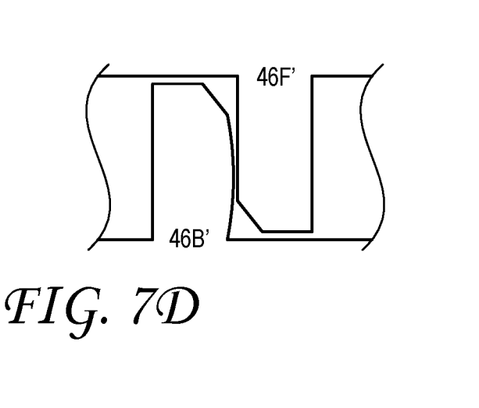
Figure 7E:
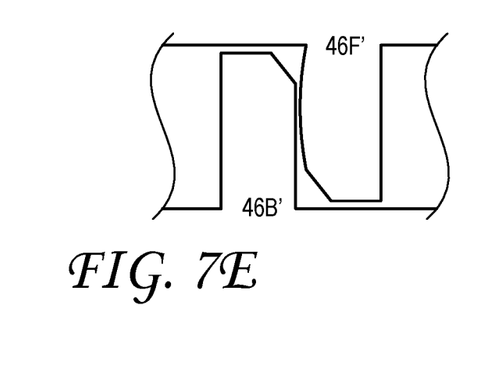
Figure 8A:
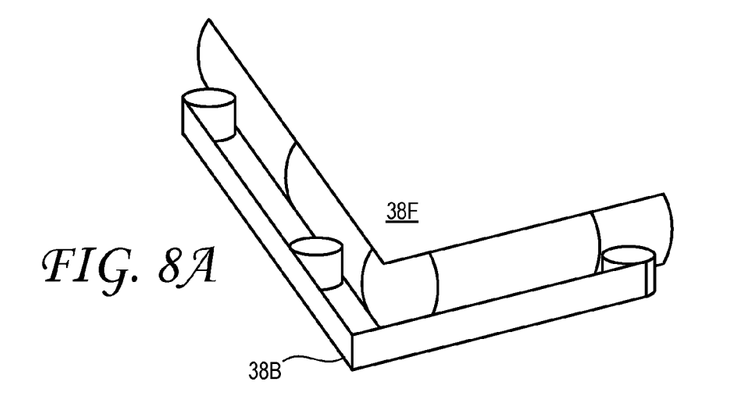
FIGS. 8A-8C show aspects of example camera components in which the back mounting features are arranged within a groove.
Figure 8B:
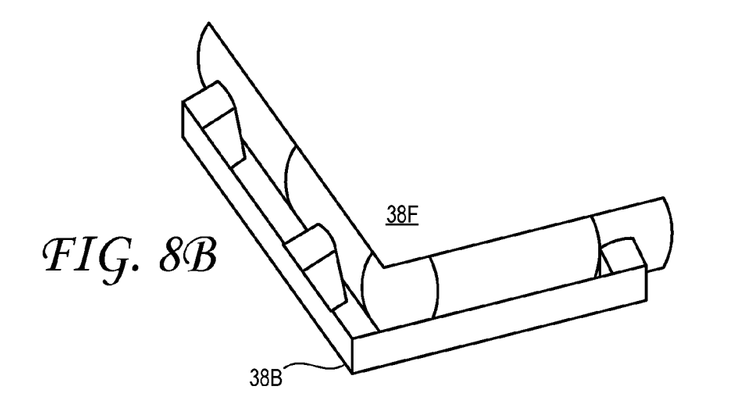
Figure 8C:
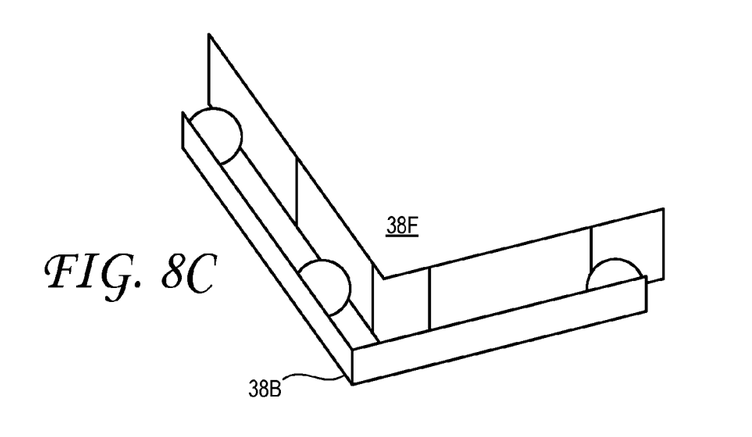
Figure 9:
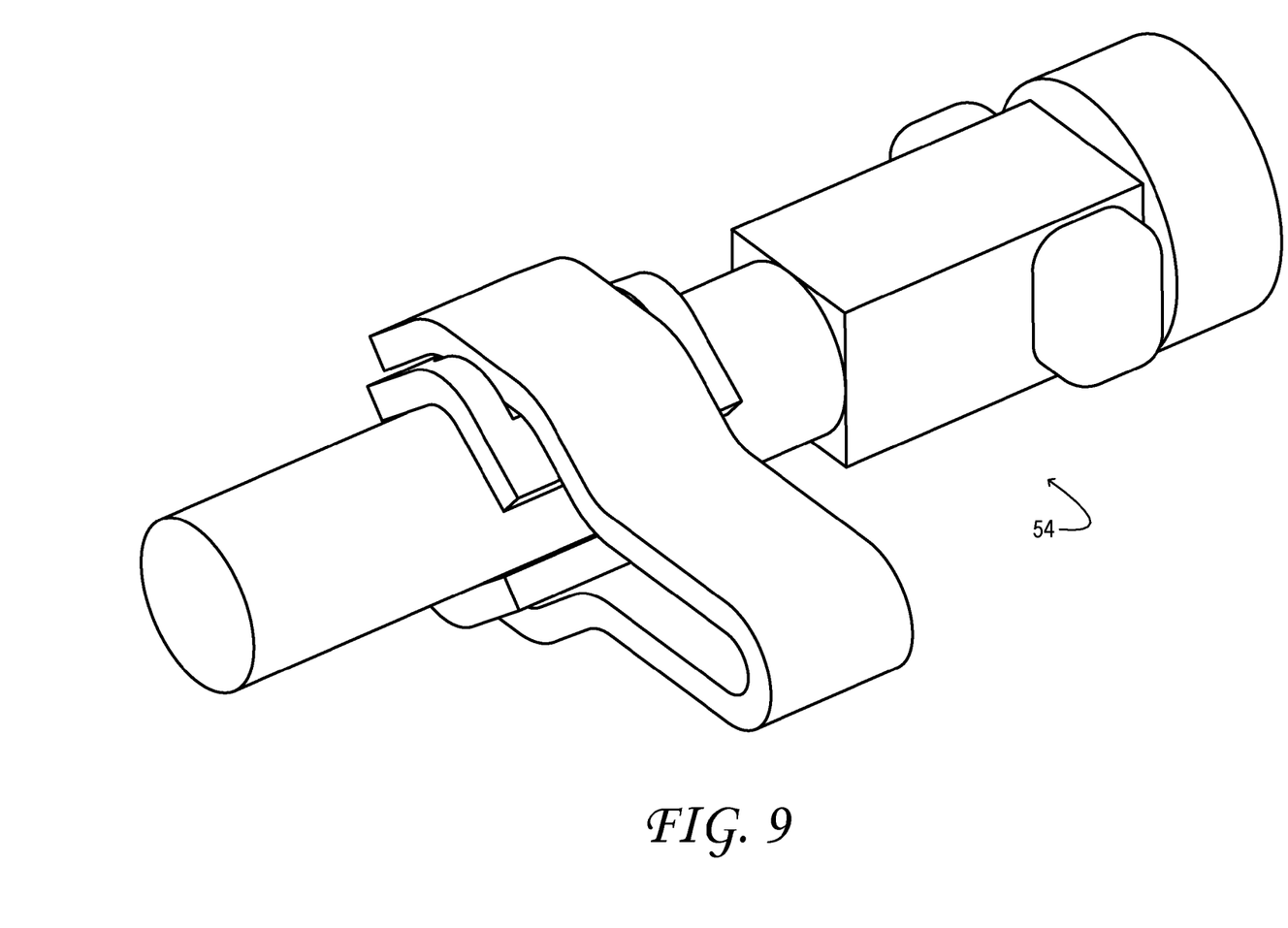
FIG. 9 shows aspects of an example piezoelectric linear actuator of a camera component.

FIG. 7A schematically shows the manner of contact between the front and back mounting features in the embodiments of FIGS. 4, 5, and 6. In some configurations, the section profile is not necessarily flat (as shown in FIG. 7A) but may instead have one side rounded along the vertical, protruding slightly in midsection. Some of these alternatives are shown by way of example in FIGS. 7B, 7C, 7D, and 7E. FIGS. 8A, 8B, and 8C provide perspective views of three different mounting configurations in which back mounting features of different geometries are arranged in a groove formed in the back optical flat 38B. In still other embodiments, the front mounting features may be arranged in a groove formed in the front optical flat 38F. FIG. 8A shows the interaction of cylindrical-pin shaped back mounting features and an orthogonal cylindrical plate-edge front mounting feature. FIG. 8B shows the interaction of block-like back mounting features and a cylindrical plate-edge front mounting feature. Here, the contacting surface of the block-like back mounting features are orthogonal to the curvature of the plate edge. In other embodiments, the surface of either of the opposing mounting features may be flat, departing somewhat from the ideal kinematic condition as previously described. FIG. 8C shows the interaction of spherical back mounting features and a flat plate-edge front mounting feature. In embodiments in which all of the mounting features are arranged at a corner, magnets 48 may be configured to draw the front and back portions together such that the front and back optical flats are held together, aligned at the corner. The magnets may also urge the front mounting features against (e.g., into) the back mounting features in the state of alignment.

It will be noted that the term 'alignment' appearing herein, refers merely to a repeatable state of relative positioning of light-collecting unit 16 and imaging unit 18 of camera component 12. This form of alignment does not itself ensure that the light-collecting and imaging units are optically aligned with the precision required for image capture. In effect, the configurations above simply ensure that any misalignment between the two units is the same or nearly so every time the handheld device is closed. The following describes two approaches to leverage the above repeatability benefit to provide correct optical alignment in camera component 12. One approach is related to manufacturing, and the other to active alignment correction prior to image capture.

The manufacturing approach admits of two variants. In one example, the light-collecting unit 16 and the imaging unit 18 of each camera component 12 may be factory aligned and bonded as a unit to front portion 20 and back portion 22, respectively, so that the units are guaranteed to be aligned whenever the front and back portions are engaged. This variant provides direct alignment of the two units of each camera component, but may not enable like units to be used interchangeably. Another example makes use of 'master' light-collection and imaging units, to which each complementary unit manufactured is aligned during a production run. Alignment of the manufactured units is indirect in this example, and therefore subject to greater tolerance. It offers an advantage, however, in that the manufactured units will be clones of each other and guaranteed to align equally well with any complementary unit.

Turning now to active alignment correction, and with repeated reference to FIG. 3, camera component 12 may include a linear actuator 54 configured to move light-collecting unit 16 pursuant to control signals from computer 28. In other embodiments, the linear actuator may be configured to move imaging unit 18. In either case, the computer may be configured to control the linear actuator responsive to an indication of alignment of light-collecting unit 16 and imaging unit 18, so as to properly align the front and imaging units. The indication may be received from an alignment sensing system of the camera component. Once the contact features are coupled, actuators configured either between the contacts and light collecting unit 16 or between the complementary contacts and imaging unit 18, or as a combination of the two, may perform movements in order to achieve auto focus or optical image stabilization while the contacts remain coupled.

The mode of operation of linear actuator 54 is not particularly limited. The linear actuator may be electromechanical or piezoelectric, for example. FIG. 8 shows aspects of a piezoelectric linear actuator 54 in one embodiment.

Figure 10A:
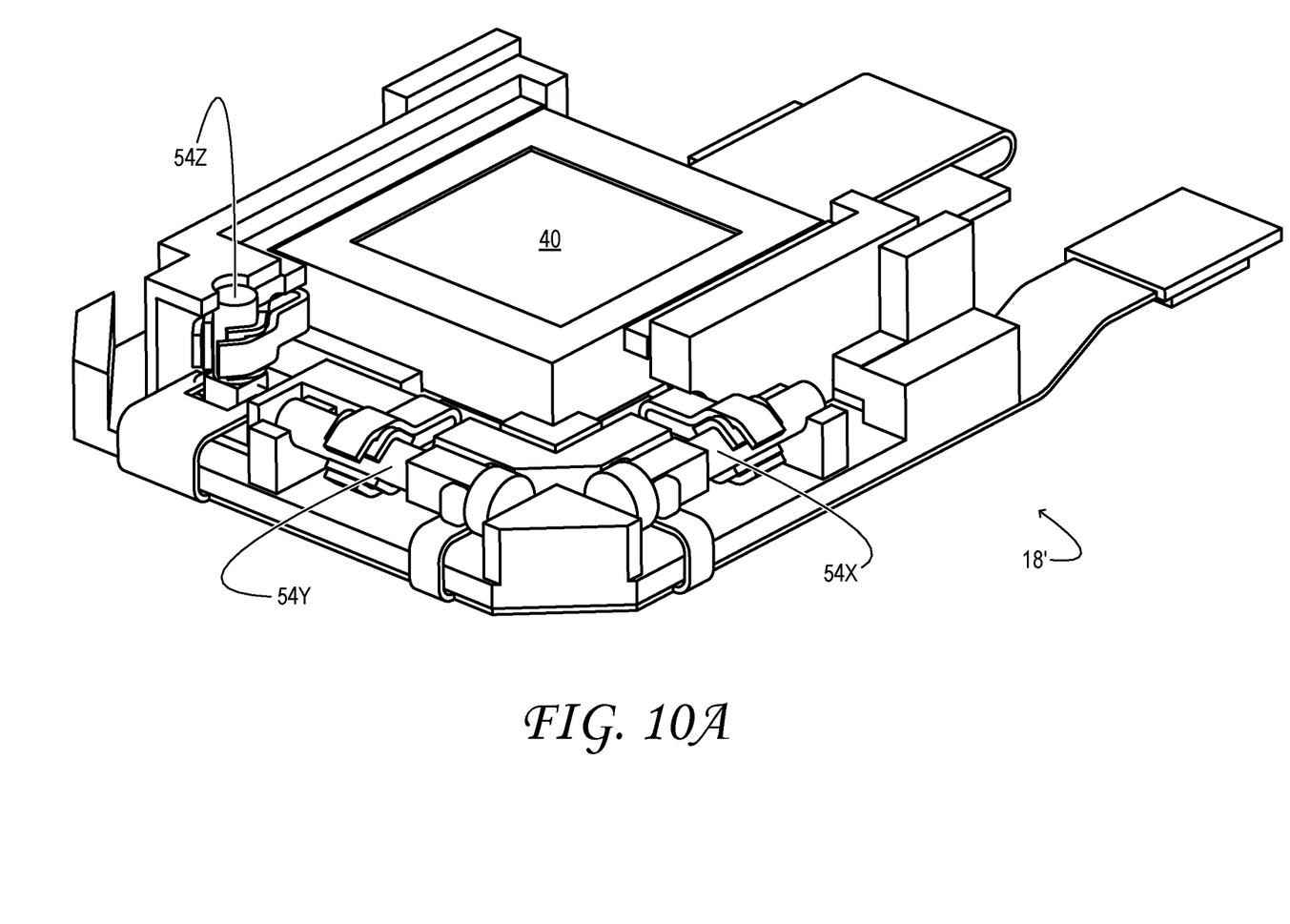
FIG. 10A and exploded FIG. 10B show aspects of an example imaging unit of a camera component.
Figure 10B:
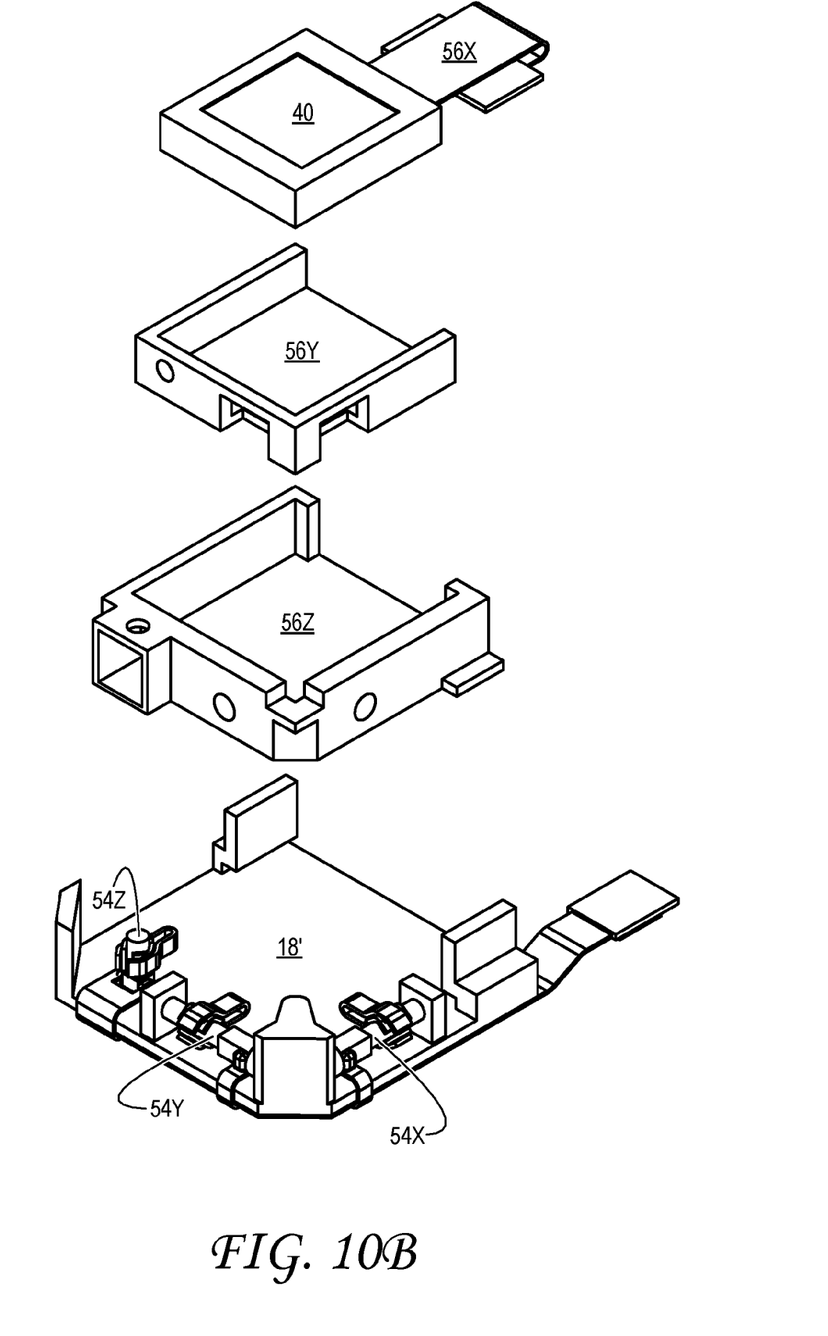

In some embodiments, camera component 12 may include a plurality of linear actuators configured to move (translate or tilt) light-collecting unit 16 or imaging unit 18 in a corresponding plurality of directions. FIG. 10A shows an example imaging unit 18' having three different translational linear actuators 54X, 54Y, and 54Z. FIG. 10B provides an exploded view of imaging unit 18'. In this embodiment, each of the translational linear actuators is coupled to a corresponding floating stage of the imaging unit—stages 56X, 56Y, and 56Z, specifically. In other embodiments, the linear actuators may instead be configured to move light-collecting unit 16, and the floating and/or rotating stages would then be arranged in the light-collecting unit.

In some embodiments, a linear actuator may be configured to address focal misalignment of light-collecting unit 16 relative to imaging unit 18, to change the effective optical path between the light-collection and imaging units, by moving the units toward or away from each other. Despite the utility of using a linear actuator for depth adjustment, other actuators and/or focal-correcting strategies are equally consonant with this disclosure. One alternative is to incorporate an electrooptical lens having an electronically tunable focal length, in one or both of the separable camera units. In FIG. 3, for example, lens 58 may be an electrooptical lens.

In some embodiments, the linear actuator that provides alignment correction may also provide optical image stabilization (OIS) for camera component 12. In these and other embodiments, cumulative manufacturing tolerances of all subcomponents may be made substantially small, such that variation of each part, camera portion to contact feature, may be held within an acceptable range that uses a fraction of the available range of the actuator (or actuators), with the remainder of available range allowing the actuator to perform its expected function. This scenario requires fairly high manufacturing tolerances, such as sensor to mount and mount to contact features or optics to mount and mount to contact features, but may provide plug-and-play usage of any light-collecting or imaging unit.

Active alignment correction in handheld device 10 may be scheduled to inform, but not interfere with subject-image capture. In particular, computer 28 may be configured to schedule the realignment automatically upon closure of the handheld device, at the first user request to capture a subject image since the handheld device was folded closed, before every subject capture, etc. In some embodiments, alignment sensing and active realignment may be enacted together, in a closed-loop manner, to ensure proper alignment of camera component 12.

One aspect of this disclosure is directed to a camera comprising: a front portion including a set of front mounting features and a light-collecting unit configured to collect light from a subject; and a back portion reversibly separable from the front portion, the back portion including a set of back mounting features and an imaging unit configured to image the light, the set of back mounting features being configured to contact the set of front mounting features at six contact points as the front and back portions are drawn together, the six contact points forming, cooperatively, a kinematic mount to hold the light-collecting and imaging units in a state of alignment.

In some embodiments, the set of front mounting features includes one or more protruding features, and the set of back mounting features includes one or more receiving features configured to receive the one or more protruding features. In some embodiments, the camera further comprises a resilient member configured to retract one or more of the protruding features when the front and back portions are separated. In some embodiments, the camera further comprises: a first optical flat arranged substantially flush with the receiving features; and a second optical flat arranged substantially flush with the protruding features when the protruding features are retracted. In some embodiments, the one or more protruding features includes one or more of a pin and a ball. In some embodiments, the one or more receiving features includes one or more of a conic depression, a groove, and a flat stop. In some embodiments, the camera further comprises a magnet configured to draw the front and back portions together and urge the front mounting features against the back mounting features. In some embodiments, receipt of each front mounting feature against an associated back mounting feature restricts at least one degree of freedom of relative movement of the light-collecting and imaging units. In some embodiments, the at least one degree of freedom is a translational or rotational degree of freedom. In some embodiments, the camera further comprises a floating coupling connecting the light-collecting unit to the front portion and a fixed coupling connecting the imaging unit to the back portion. In some embodiments, the set of front mounting features includes one or more protruding features, the set of back mounting features includes one or more receiving features configured to receive the one or more protruding features, and the floating coupling is a resilient member configured to retract one or more of the protruding features when the front and back portions are separated. In some embodiments, the floating coupling includes a diaphragm or gasket. In some embodiments, the camera further comprises a fixed coupling connecting the light-collecting unit to the front portion and a floating coupling connecting the imaging unit to the back portion.

Another aspect of this disclosure is directed to an electronic device comprising: a front portion including a set of front mounting features and a light-collecting unit configured to collect light from a subject; a back portion reversibly separable from the front portion, the back portion including a set of back mounting features and an imaging unit configured to image the light, the set of back mounting features being configured to contact the set of front mounting features as the front and back portions are drawn together, forming, cooperatively, a kinematic mount to hold the light-collecting and imaging units in a state of alignment; and a retaining member configured to couple the front portion to the back portion when the front and back portions are drawn together and when the front and back portions are drawn apart.

In some embodiments, the retaining member is a hinge. In some embodiments, the retaining member is a slide. In some embodiments, the retaining member includes a resilient member configured to draw the front and back portions together and urge the front mounting features into the back mounting features.

Another aspect of this disclosure is directed to a camera comprising: a front portion including a light-collecting unit configured to collect light from a subject, a front optical flat arranged over the light-collecting unit, and a set of front mounting features arranged at an exterior of the front optical flat; a back portion reversibly separable from the front portion, the back portion including an imaging unit configured to image the light, a back optical flat arranged over the imaging unit, and a set of back mounting features arranged at an exterior of the back optical flat, the set of back mounting features being configured to contact the set of front mounting features as the front and back portions are drawn together with the front and back optical flats in contact, the sets of front and back mounting features and optical flats forming, cooperatively, a kinematic mount to hold the light-collecting and imaging units in a state of alignment; and a magnet configured to draw the front and back portions together, to hold the front and back optical flats together and to urge the front mounting features against the back mounting features.

In some embodiments, the set of back mounting features is configured to contact the set of front mounting features at three contact points. In some embodiments, the set of back mounting features is configured to form, on receiving the set of front mounting features, a two-point contact at one edge of the back optical flat and a one-point contact at an adjacent edge of the back optical flat. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
 a front portion including a set of front mounting features and a light-collecting unit configured to collect light from a subject; and
 a back portion reversibly separable from the front portion, the back portion including a set of back mounting features and an imaging unit configured to image the light, the set of back mounting features being configured to contact the set of front mounting features at exactly six contact points as the front and back portions are drawn together, the exactly six contact points forming, cooperatively, a kinematic mount to hold the light-collecting and imaging units in a state of alignment while discouraging movement into alternative states of alignment.

2. The camera of claim 1 wherein the set of front mounting features includes one or more protruding features, and wherein the set of back mounting features includes one or more receiving features configured to receive the one or more protruding features.

3. The camera of claim 2 further comprising a resilient member configured to retract one or more of the protruding features when the front and back portions are separated.

4. The camera of claim 3 further comprising:
 a first optical flat arranged substantially flush with the receiving features; and
 a second optical flat arranged substantially flush with the protruding features when the protruding features are retracted.

5. The camera of claim 2 wherein the one or more protruding features includes one or more of a pin and a ball.

6. The camera of claim 2 wherein the one or more receiving features includes one or more of a conic depression, a groove, and a flat stop.

7. The camera of claim 1 further comprising a magnet configured to draw the front and back portions together and urge the front mounting features against the back mounting features.

8. The camera of claim 1 wherein receipt of each front mounting feature against an associated back mounting feature restricts exactly one degree of freedom of relative movement of the light-collecting and imaging units.

9. The camera of claim 8 wherein the at least one degree of freedom is a translational or rotational degree of freedom.

10. The camera of claim 1 further comprising a floating coupling connecting the light-collecting unit to the front portion and a fixed coupling connecting the imaging unit to the back portion.

11. The camera of claim 10 wherein the set of front mounting features includes one or more protruding features, wherein the set of back mounting features includes one or more receiving features configured to receive the one or more protruding features, and wherein the floating coupling is a resilient member configured to retract one or more of the protruding features when the front and back portions are separated.

12. The camera of claim 10 wherein the floating coupling includes a diaphragm or gasket.

13. The camera of claim 1 further comprising a fixed coupling connecting the light-collecting unit to the front portion and a floating coupling connecting the imaging unit to the back portion.

14. An electronic device comprising:
 a front portion including a set of front mounting features and a light-collecting unit configured to collect light from a subject;
 a back portion reversibly separable from the front portion, the back portion including a set of back mounting features and an imaging unit configured to image the light, the set of back mounting features being configured to contact the set of front mounting features as the front and back portions are drawn together, forming, cooperatively, a kinematic mount to hold the light-collecting and imaging units in a state of alignment, wherein receipt of each front mounting feature against an associated back mounting feature restricts exactly one degree of freedom of relative movement of the light-collecting and imaging units; and
 a retaining member configured to couple the front portion to the back portion when the front and back portions are drawn together and when the front and back portions are drawn apart.

15. The electronic device of claim 14 wherein the retaining member is a hinge.

16. The electronic device of claim 14 wherein the retaining member is a slide.

17. The electronic device of claim 14 wherein the retaining member includes a resilient member configured to draw the front and back portions together and urge the front mounting features into the back mounting features.

18. A camera comprising:
 a front portion including a light-collecting unit configured to collect light from a subject, a front optical flat arranged over the light-collecting unit, and a set of front mounting features arranged at an exterior of the front optical flat;
 a back portion reversibly separable from the front portion, the back portion including an imaging unit configured to image the light, a back optical flat arranged over the imaging unit, and a set of back mounting features arranged at an exterior of the back optical flat, the set of back mounting features being configured to contact the set of front mounting features at exactly three contact points as the front and back portions are drawn together with the front and back optical flats in contact, the sets of front and back mounting features and optical flats forming, cooperatively, a kinematic mount to hold the light-collecting and imaging units in a state of alignment while discouraging movement into alternative states of alignment; and a magnet configured to draw the front and back portions together, to hold the front and back optical flats together and to urge the front mounting features against the back mounting features.

19. The camera of claim 18 wherein the set of back mounting features is configured to form, on receiving the set of front mounting features, a two-point contact at one edge of the back optical flat and a one-point contact at an adjacent edge of the back optical flat.

* * * * *